United States Patent [19]

Perine et al.

[11] Patent Number: 4,814,883
[45] Date of Patent: Mar. 21, 1989

[54] MULTIPLE INPUT/OUTPUT VIDEO SWITCH FOR COMMERICAL INSERTION SYSTEM

[75] Inventors: Michael C. Perine; Eric J. Softley, both of Key Biscayne, Fla.

[73] Assignee: Beam Laser Systems, Inc.

[21] Appl. No.: 140,616

[22] Filed: Jan. 4, 1988

[51] Int. Cl.⁴ .................................... H04N 5/268
[52] U.S. Cl. ................................. 358/181; 358/84; 358/142; 358/86
[58] Field of Search ............... 358/181, 84, 142, 86

[56] References Cited

U.S. PATENT DOCUMENTS

| | | | |
|---|---|---|---|
| 4,404,589 | 9/1983 | Wright | 358/86 |
| 4,532,547 | 7/1985 | Bennett | 358/181 X |
| 4,538,174 | 8/1985 | Gargini et al. | 358/86 |
| 4,547,804 | 10/1985 | Greenberg | 358/142 |
| 4,575,750 | 3/1986 | Callahan | 358/86 |
| 4,625,235 | 11/1986 | Watson | 358/86 |
| 4,638,181 | 1/1987 | Deiss | 358/181 |
| 4,638,359 | 1/1987 | Watson | 358/86 X |
| 4,639,779 | 1/1987 | Greenberg | 358/142 |
| 4,647,964 | 3/1987 | Weinblatt | 358/84 |
| 4,656,629 | 4/1987 | Kondoh et al. | 358/86 |
| 4,733,301 | 3/1988 | Wright | 358/181 |

FOREIGN PATENT DOCUMENTS 248533 12/1987 European Pat. Off. ............... 358/84
8504543 10/1985 PCT Int'l Appl. .

OTHER PUBLICATIONS

Rice et al., "Implementing a Commercial Insertion System", Mar. 21, 1988, 2 pages.

Primary Examiner—James J. Groody
Assistant Examiner—E. Anne Faris
Attorney, Agent, or Firm—Robert C. Kain, Jr.

[57] ABSTRACT

In one embodiment, the commercial insertion system includes, at a control center, a source of commercial inserts and a processor for generating various command signals based upon monitoring a plurality of programmed channels signals on a per channel basis. A stream of commercial insert video signals and the command signals are sent via a satellite up link to regional cable systems generally grouped as East Coast stations and West Coast stations. A multiple input/output video switch system is located at the video head of each cable system. This video switch system includes a local video signal generator and a video switch for each channel having local available commercial time slots. The video switch applies, at its output, either the programmed channel signal received by the cable system from a first telecommunications network, the commercial insert signal received from the second telecommunications network or the local video signal, all dependent upon switch commands sent from the control center via the second telecommunications network. A mechanism is provided for producing a frame blanking signal intermediate the application of the programmed channel signal, the commercial insert signal and the local video signal and for generating characters for each particular spot commercial.

23 Claims, 4 Drawing Sheets

MULTIPLE INPUT/OUTPUT VIDEO SWITCH FOR COMMERICAL INSERTION SYSTEM

BACKGROUND OF THE INVENTION

The present invention relates to a video switching device and particularly relates to a multiple input, multiple output video switching system for inserting commercial advertisements or inserts into a plurality of preprogrammed video (television) channel signals.

Typically, a cable company receives television or video composite signals, those signals being a composite of video or visual signals and the audio signals, via a satellite dish or other telecommunications network. In a large number of cases, the video composite signals for one or more television channels originate at a remote location distant from the cable television station. The programmed channel video signal is "beamed up" to a satellite and the satellite beams down the programmed channel signal to regional sections in the U.S. where the cable system is located. This telecommunications network is called the satellite up link for the cable system.

In a number of cable channels such as MTV, NICK, VH1, DISC, LIFE, A&E, T&N, ESPN, USA, FNN and CBN, some time is set aside during the hourly run of the programmed show or segment for local cable systems to pre-empt the advertisement spots on the channel in favor of local commercial inserts. These available time slots are called in the industry local avails. Typically, the local avails are one or two minute time periods and are found in the time block extending from 20 minutes until 36 minutes past the hour and in the time block from 50 past the hour until 6 minutes past the succeeding hour.

In order to signal cable systems that a local avail time block on a particular channel is coming up, each of the aforementioned channels include in the audio section of the video composite signal a DTMF (dual tone multi-frequency) signal both shortly before the local avail time segment and immediately at the leading time edge of the local avail. A further convention adopted by these channels is to issue DTMF signals to signal the lagging time edge of the local avail.

There is a known prior art device that monitors the incoming programmed channel video signal in order to detect the DTMF signals signifying the local avail time slot. After sensing the DTMF local avail signal, this device inserts a local commercial generally by operating a video switch that selects a locally generated commercial insert video signal from one input of the video switch as opposed to selecting the programmed channel video at the other input. However, this prior art device is only capable of inserting one commercial insert in a single channel. However, many of the local avail time slots from the various channels mentioned above overlap since the local avail slots generally fall within 10 minutes before and six minutes after the top of the hour and the half hour. Since the cable systems are not well equipped to utilize these prior art devices on a per channel basis and particularly in view of the fact that the video machines generating the commercial insert video signals must be independently operated per channel, most cable systems do not effectively use these local available time slots on the designated LA (local available) channels described above. Therefore, the cable system is losing revenue because of its inability to exploit these local avail time slots on all of the LA channels.

The present invention overcomes this disadvantage by utilizing a multiple input, multiple output video switch system, that has a video switch for each channel, and that is controlled by a remote control center sending command signals and commercial insert video signals to the switch over a telecommunications network that is generally independent of the programmed LA channels. It should be noted that "programmed channel" does not indicate whether the show or video segment played on that channel has been programmed sometime in the past or is currently a live presentation, but simply designates the general type of video signal that cable systems receive from various origination points. In any event, "programmed channel video signal" refers to the signal obtained via a satellite up link from a program origination center and received by a cable system other than the center transmitting the commercial inserts and commands in accordance with the present invention.

OBJECTS OF THE INVENTION

It is an object of the present invention to provide a video switching system that is remotely controlled to apply at each video switch either a programmed channel signal, a commercial insert video signal or a local video signal, the latter two signals being inserted as a pre-emption of the programmed channel signal during a local avail time slot.

It is another object of the present invention to provide a system wherein the cable system can better utilize local avail time slots on all of the LA channels.

It is a further object of the present invention to provide a video switching system that inserts the cable system identification video when the local avail time slot for a particular channel falls within a play time of a commercial insert.

It is another object of the present invention to provide a video switch system that includes a frame blanking signal at the video output of each particular video switch at an intermediate time between the application of the programmed channel signal, the commercial insert signal and the local video signal.

It is a further object of the present invention to provide a video switch system that applies the local video signal to the video outputs of respectively activated video switches when a cross-promotion spot commercial being played is for a non-available programming service wherein the non-available service is not available to the viewers of that cable system.

It is a further object of the present invention to provide a commercial insertion system wherein a stream of commercial insert video signals and an asynchronous stream of command data and information is sent, via a telecommunications network including in most cases a satellite up link, to various cable systems.

SUMMARY OF THE INVENTION

In one embodiment, the commercial insertion system includes, at a control center, a source of commercial inserts and a processor for generating various command signals based upon monitoring a plurality of programmed channels signals on a per channel basis. A stream of commercial insert video signals and the command signals are sent via a satellite up link to regional cable stations generally grouped as East Coast stations and West Coast stations. A multiple input/output video switch system is located at the video head of each cable station. This video switch system includes a local video signal generator and a video switch for each channel having local available commercial time slots. The video switch applies, at its output, either the programmed channel signal received by the cable system from a first telecommunications network, the commercial insert signal received from the second telecommunications network or the local video signal, all dependent upon switch commands sent from the control center via the second telecommunications network. A mechanism is provided for producing a frame blanking signal intermediate the application of the programmed channel signal, the commercial insert signal and the local video signal and for generating characters for each particular spot commercial.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a multiple input/output video switch system at the video head of a cable system or system and relates to, on a broader scale, a commercial insertion system that operates in conjunction with a telecommunications network.

Figure 1:
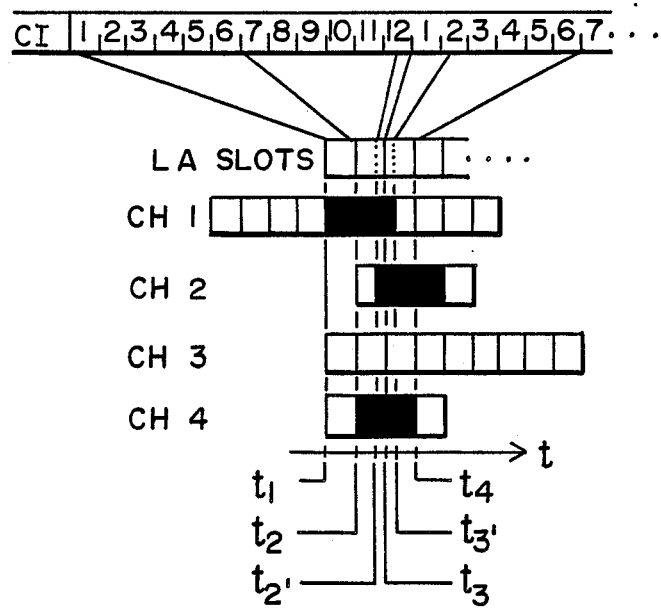
FIG. 1 diagrammatically illustrates local available time slots for channels 1, 2, 3 and 4 and the overlap between those LA time slots.

FIG. 1 diagrammatically illustrates local available (LA) time slots and the sequential stream of commercial insert (CI) video signals that are inserted into those LA time slots. These LA time slots are present in channels 1-4 designated throughout the figures and herein as Ch 1, Ch 2, Ch 3 and Ch 4. The commercial insert, CI, line in FIG. 1 shows that commercial inserts 1-12 are available to be inserted into the first and second LA time slots. In one embodiment, each LA slot is a one minute time interval and each CI is a 10 second spot commercial that is a time sensitive, cross-promotion, tune in advertising commercial for one of the channels carried by the cable systems or cable companies. For example, the following CI table lists an abbreviated sequential stream of commercial inserts.

| CI TABLE | |
|---|---|
| SEQ. # | AD |
| 1 | HBO |
| 2 | TNN |
| 3 | CBN |
| 4 | MTV |
| 5 | USA |
| 6 | LIFE |
| . | |

| CI TABLE | |
|---|---|
| SEQ. # | AD |
| . | |
| 12 | SHO |

Therefore, CI 1 is a 10 second spot ad for Home Box Office (HBO) providing a short clip of an upcoming movie. As will be discussed later, the CI also includes the time that the HBO movie will be shown. CI 2 is a 10 second spot commercial for The Nashville Network (TNN) that may show an upcoming concert advertisement as well as the time for that concert. The following table lists the channels which local avail time slots are available for commercial insertion. The LA channel table is not meant to be exclusive or limited to those designated channels but is only meant to be exemplary in nature.

| LA CHANNEL TABLE | |
|---|---|
| MTV | TNN |
| NICK | ESPN |
| VH1 | USA |
| DISC | FNN |
| LIFE | CBN |
| A&E | |

Therefore, FIG. 1 shows Ch 1-4 as being four of the LA channels. CI spot commercials 1-12 are cross-promotion tune in advertisements because each spot commercial advertises shows on other channels such as HBO, Showtime and Cinemax. The sum total of channels viewable on a particular cable system is called herein the available channels. These available channels may not include one of the cross-promotion CI channels in the CI stream. This non-available cross-promotion channel is called herein a non-available channel and will be discussed in detail later.

The sequential stream of commercial insert video composite signals is made up of spot commercials designated CI 1-12. These are presented sequentially as shown in FIG. 1. After the last spot commercial CI 12 in the sequential stream, the control center, that is described later, restarts the sequential stream at CI 1.

In FIG. 1, Ch 1 has the first available LA time slot out of the illustrated universe of channels 1-4. The LA time slot is shown by a blackened portion in FIG. 1. The leading time edge of CI 1 is at time $t_1$. As discussed earlier, Ch 1 is a programmed channel video composite signal. Ch 1 includes prior to $t_1$ two DTMF signals indicating that the LA time slot is approaching and then indicating the beginning of the LA slot at time $t_1$. At time $t_2$, Ch 4 begins its LA time slot. Since the sequential stream of commercial input video signals has already been started and inserted into Ch 1, the leading time edge of CI 7 coincides with the leading time edge of the LA time slot on Ch 4. Therefore, at time $t_2$, Ch 4 presents CI 7 for viewing.

At time $t_{2'}$, the leading time edge of the LA slot for Ch 2 occurs. However, since time $t_{2'}$ falls during a play time of intermediate commercial spot CI 12, the commercial spot is not immediately shown in Ch 2. In its place, a local video signal is applied to the output of the Ch 2 video switch thereby presenting the local video signal to viewers of Ch 2. This is also described in detail later on. At time $t_3$, CI 12 is completed which marks the end of the sequential stream of commercial insert video signals. Since Ch 2 and Ch 4 are still within their LA time blocks, the sequential stream is restarted beginning with CI 1.

At time $t_{3'}$, Ch 1 notes the end of the LA time block. This is noted by two DTMF signals, one DTMF signal preceding the lagging time edge of the LA time block and the second DTMF signal coinciding with the lagging time edge of the LA time block. Since time $t_{3'}$ falls within the play time of CI 2, and due to the warning DTMF signal on Ch 1, CI 2 is not displayed on Ch 1 but rather the local video signal is played on Ch 1 for the relatively short time period until time t.

At time $t_4$, LA time block for Ch 3 begins. The LA time block for Ch 4 ends at time $t_4$. Since at time $t_4$ CI 6 ends, Ch 4 immediately returns to the programmed channel video signal that originates from a remote site for that channel. In other words, the channel returns to its normal programmed format and display and the cable system or station no longer contractually has the right to override the programmed channel video signal by inserting advertisements.

FIG. 1 graphically shows the overlap between the local available time blocks for Ch 1–4. As stated earlier, prior art devices can only insert commercials in one of the channels and if the other channels have overlapping LA time blocks, the prior art devices cannot show the commercial inserts on those other channels. For example, the prior art device could add commercial inserts on Ch 1 but would not be able to add commercial inserts in Ch 4 or Ch 2 because of the overlap. This translates into lost revenues for the cable stations or systems since they can not obtain advertising revenue for the LA time blocks on Ch 2 and Ch 4. Since the time block on Ch 1 ends prior to the leading time edge of the LA time block for Ch 3, the cable station could run a commercial insert on Ch 3.

Figure 2:
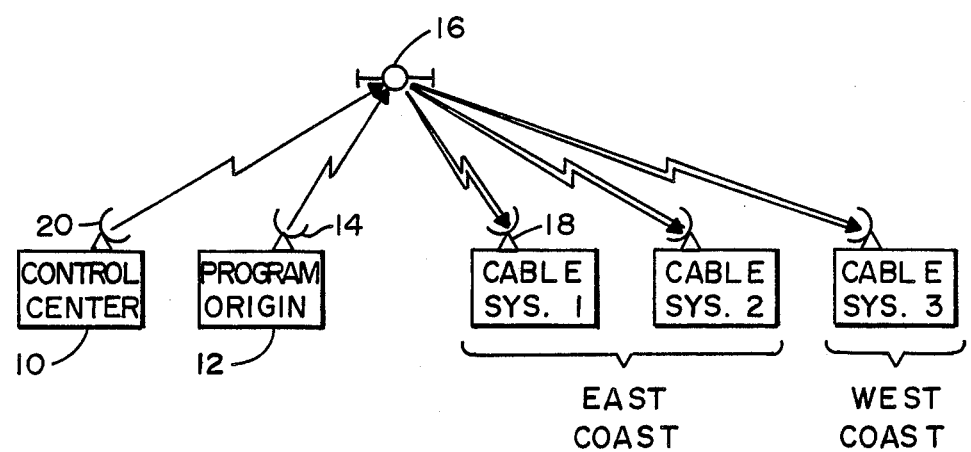
FIG. 2 diagrammatically illustrates the control center, program origin station and cable systems 1-3 that are supplied with signals via a satellite up link.

FIG. 2 diagrammatically illustrates the commercial insertion system that utilizes first and second telecommunications networks. The commercial insertion system of the present invention includes a control center 10 and a head video switching system in each of cable systems 1, 2 and 3. Cable systems 1 and 2 are East coat stations therefore time of play of the cross-promotion is different as compared with the time of play of that promotion on the West coast station of cable system 3. For example, if CI 1 represented a 10 second ad for an HBO movie, the HBO movie would play East coast time at 8:00 but would play at a different time on the West coast. The programmed channel video composite signal originates from program origin unit 12. Program origin unit 12 includes a satellite dish 14 that beams up via a first telecommunications network to a satellite 16. This signal is beamed down to satellite dish 18 of cable system 1 via the same telecommunications network. In contrast, control center 10 includes satellite up link 20 that beams the sequential stream of commercial insert video signals as well as command and data signals up to satellite 16 via a second telecommunications network. The sequential stream of CI signals as well as the commands are beamed down to cable system 1 via the same telecommunications network. In actuality, the first and second telecommunications networks could be similar if control center 10 was at the same location as program origin 12. However, it is not necessary since it is well known in the art how to link video and command signals between various remote stations ia a satellite up link. What is most important is that the sequential stream of CI signals and commands from control center 10 is not directly associated with the program channels. Other telecommunications networks can be used rather than satellite networks, such as fiber optic cable transmissions, and the claims appended hereto are meant to cover such embodiments.

Figure 3:
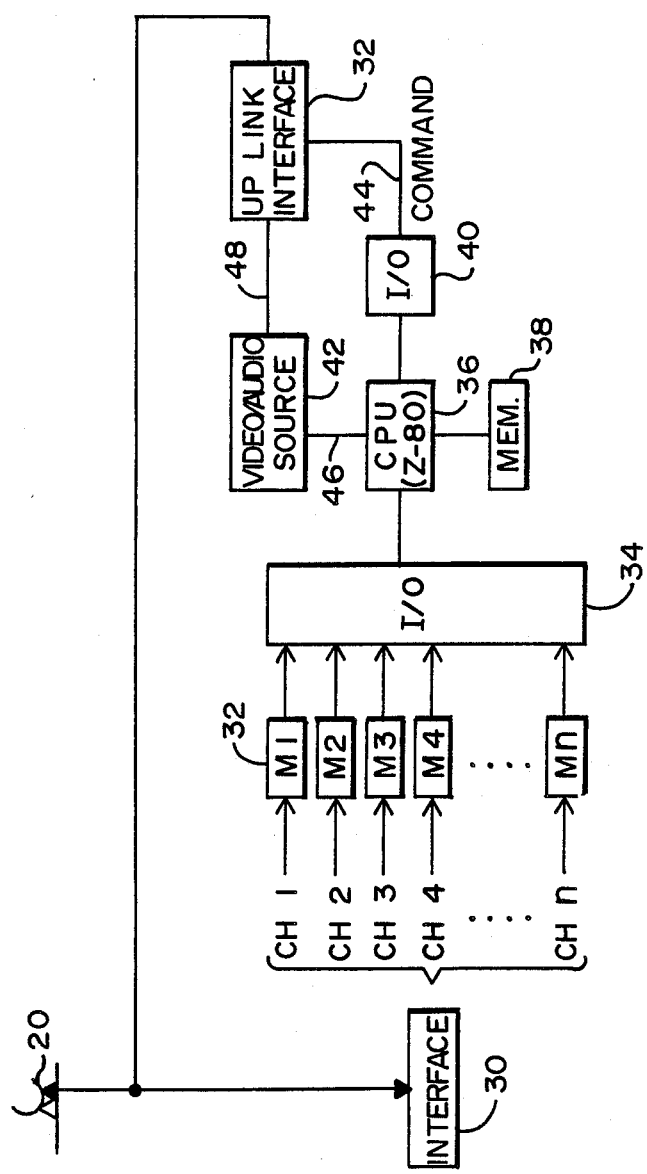
FIG. 3 illustrates, in block diagram form, the major components in the control center.

FIG. 3 illustrates, in block diagram form, the important components in control center 10. Those components include satellite dish 20, downlink satellite interface 30, and satellite up link interface 32. The interfaces are coupled to the satellite dish 20 and condition and format the signal sent to and received from the satellite. In general, satellite dish 20 receives all of the LA channels listed in the above mentioned table. These channels are shown as Ch 1, 2, 3, 4 and n. The control center includes, for each channel, a monitor and detector uniquely associated with the particular channel. Therefore, Ch 1 is monitored by detector M 1 shown as detector 32 in FIG. 3. Detector 32 detects the DTMF signals included in the programmed channel video signal on Ch 1. Upon detection of these DTMF signals, detector 32 raises a flag or an interrupt for input/output device 34. Input/output device 34 is coupled to a processor means which is shown as CPU 36 in FIG. 3. CPU 36 is a Z-80 microprocessor. CPU 36 is coupled to memory 38, another input/output device 40, and a video/audio source or generator 42. CPU 36 operates with memory 38 to provide the appropriate command signals and data that will be output via input/output device 40 on command line 44. CPU 36 also generates a start sequence signal on line 46 that activates video source 42 to output the sequential stream of commercial insert video signals on line 48. The command and data signals on line 44 and the sequential stream of CI signals on line 48 are applied to satellite up link interface 32 and ultimately those signals are conditioned and formatted, sent to satellite dish 20 and beamed up to the satellite 16 shown in FIG. 2. Video source 42 is a means for generating the sequential stream of CI video signals, that comprise the plurality of spot commercials upon receipt of a send command applied to line 46 by CPU 36. The video source may be a multiple video laser disc, a video tape, or a digital video still frame, all operating in combination with an audio source.

The microprocessor based system shown in FIG. 3 operates much faster than the incoming video signals on Ch 1 through n because the programmed channels appear 30 frames per second on a real time basis whereas the microprocessor operates on a much faster basis. The speed of the microprocessor is measured in operations per nanoseconds. Therefore, the detection of another LA time slot such as time slot beginning at time $t_{2'}$ on Ch 2 in FIG. 1, does not present a problem from a data processing standpoint for the microprocessor system.

CPU 36 generates first, second and third switch command signals for each of the channels Ch 1, 2, 3, 4 and n. The first switch command passes the programmed channel video through the video switch at the cable system, i.e., at a time prior to $t_1$. The second command inserts the sequential stream of commercial inserts into Ch 1 at time $t_1$. At time $t_3$, CPU 36 realizes that the sequential stream of CI signals has ended due to the lagging time edge of CI 12, and rebegins the sequential stream by instructing video source 42 to start again at CI 1. Shortly prior to time $t_{3'}$, detector M 1 senses the precursive or warning DTMF signal for the end of the LA time block for Ch 1 and notifies CPU 36 of the upcoming end of the LA time block. CPU 36 executes a program to determine the ending time of the LA time block based upon the warning DTMF signal, and correlate the remaining time to the end of the LA time block with respect to the play time of the spot commercial. CPU 36 at the end of CI 1 issues a third switch command signal which switches the video switch for Ch 1 from switch setting 2 (the CI switch setting) to the third switch setting (the local video switch setting). When detector M 1 senses the coincidental DTMF signal for the end of the LA time block for Ch 1, CPU 36 then issues a Ch 1, first switch command signal for video switch Ch 1. Again, the processing speed of the processor and the transmission link to the cable systems is much faster than the 30 frame per second video time on the monitored channels Ch 1-n. Therefore, the coincidental detection of the leading time edge and the lagging time edge of the LA time blocks does not present a problem, notwithstanding that these commands must be mixed, formatted,—transmitted via satellite dish 20 to satellite 16 and transmitted down to the various cable systems.

Therefore, CPU 36 generates, on a per channel basis, the first switch command whenever the video switch at the cable system should be outputting the programmed channel video, that time being before and after the local avail signal which is the coincidental DTMF signal on the leading time edge and lagging time edge of the LA time blocks. The second switch command is generated by CPU 36 after detection of that local avail (DTMF signal) at the leading time edge of the spot commercial. See CI 1 and CI 7 and the second occurrence of CI 7. The third switch command, indicating that the video switch must apply the locally generated video, is generated by CPU 36 at any time when the local avail DTMF signal is detected during a play time of an intermediate commercial spot within the sequential stream of CI video signals. See times $t_{2'}$ and $t_{3'}$ in FIG. 1.

Figure 4:
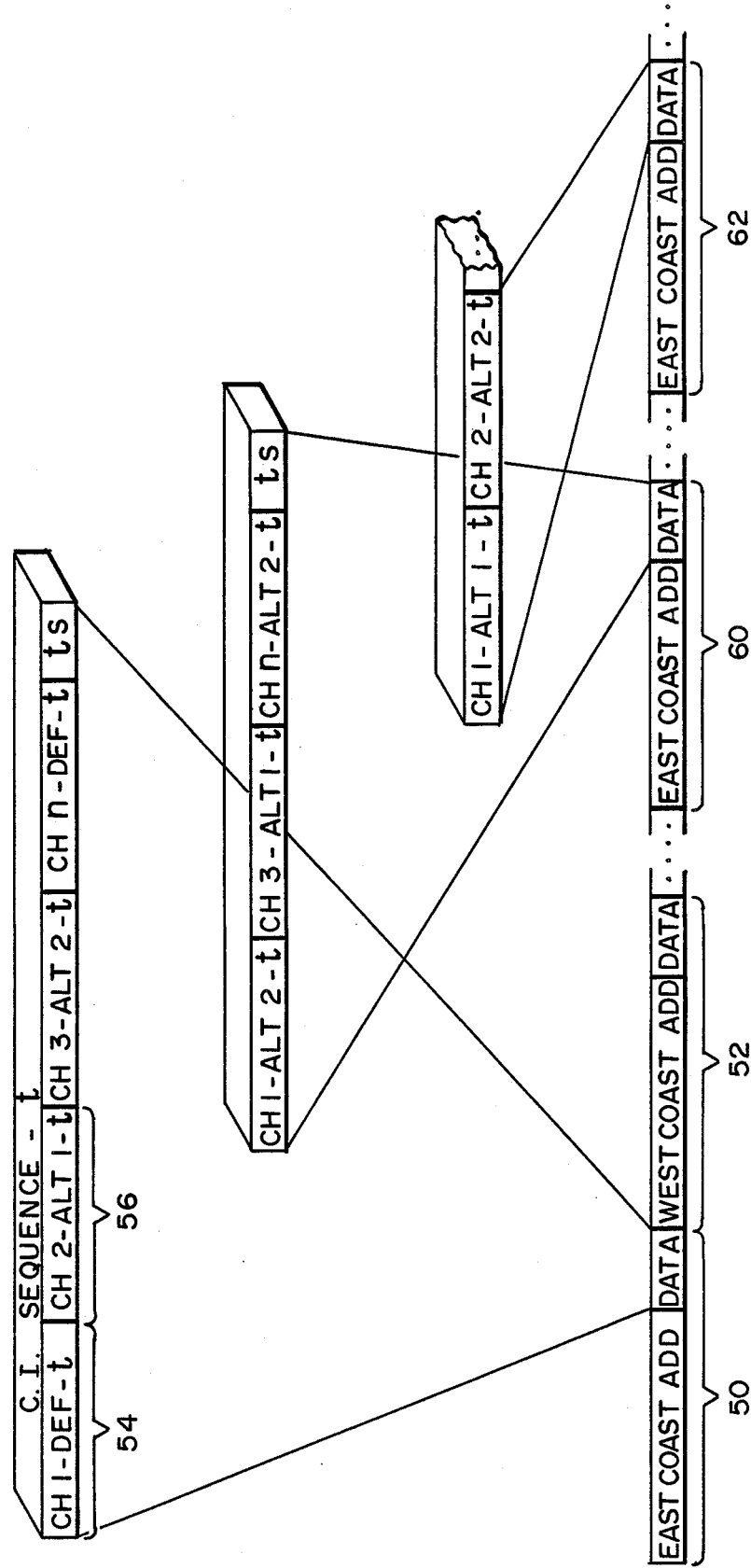
FIG. 4 diagrammatically illustrates the command signal stream and commercial insert (CI) sequence stream that is sent to the cable systems.

FIG. 4 diagrammatically illustrates the data command and information stream generated by the control center, generally representing the signal on command line 44 at the input of satellite up link interface 32 of FIG. 3. The command data and information stream can be thought of as having an East coast address and a data section for each data word shown generally as word 50 in FIG. 4. Immediately following word 50 is word 52 that has a West coast address and a succeeding data portion. The data portions are detailed in FIG. 4 as having switch settings and the CI sequence. It should be noted that the presentation of command signals in FIG. 4 is only exemplary and many different techniques for sending and formatting the command signals may be utilized. FIG. 4 is presented only for information purposes. The first section 54 of the data portion of word 50 is Ch 1-DEF-t. This is a command for the video switch for Ch 1. DEF represents the first switch command and refers to a default command which is a switch setting to pass the programmed channel video signal through the switch t in word section 54 is a timing indicator that provides a timing reference to the video switch in the cable system. This timing reference tells a processing unit in the video switch system at what time to change the setting on the video switch principally to re-institute the programmed channel video signal at the output switch. Section 56 is a channel 2 second switch command. Ch 2-ALT1 indicates that the video switch for channel 2 should be switched to alternate 1 (corresponding to the second switch command) which applies the sequential stream of CI video signals at time t to Ch 2. Likewise, the next section indicates that channel 3 switch should be switched to alternate 2 which is the third switch command at time t such that the local video signal is viewed on Ch 3 at time t. The last illustrated word section is for channel n which indicates that the default or first switch command should be activated thereby re-instituting the programmed channel video signal at time t. Word section $t_5$ is a timing bit or word sent to the CPU at the cable system such that the CPU can time the switching of the various video switches for each channel.

The data portion of each word also includes a commercial identifier sequence and a timing bit or timing word t. The CI identifier sequence corresponds to the CI sequence shown in FIG. 1 of CI 1-12 and re-beginning with CI 1 based upon the controlling operation of CPU 36 in FIG. 3 at the control center 10. Program module table 1 that follows lists the general program steps for CPU 36. The steps in table 1 need not precisely be done in the sequence illustrated.

PROGRAM MODULE TABLE 1

1. Detects DTMF on multiple channels
2. Determines when to switch video switch from default to Alt. 1, Alt. 2
3. Computes switch time per data word
4. Correlates tag, time and time zone with CI.
5. Configures command word: East Coast and West Coast
6. Transmit commercial insert sequence concurrent with commands Steps 1 through 3 are explained above. Step 4 is the correlation step where the tag is associated with the East Coast time zone (East Coast address) and the West Coast time zone address, diagrammatically illustrated in FIG. 4 in command words and 52. The tag is one or more lines added to the spot commercial CI 1-12 and shows the East Coast time or West Coast time, as is appropriate. The correlation of the time in step 4 refers both to the timing of the switches t and word sections 54 and 56 as well as the CI identifier sequence and time section t. Steps 5 and 6 are explained above.

As shown in FIG. 4, channel 1 first has the default switch setting (first switch command), then alternate 2 switch setting (second switch command) and then alternate 1 switch setting (third switch command). Therefore, on channel 1 first the programmed channel video signal is output from Ch 1 video switch, then the local video signal (Alt. 2) then the sequential stream of commercial inserts (Alt. 1). The correspondence of the command words in FIG. 4 with respect to the channels is not the same as that shown for Ch 1, 2, 3 and 4 in FIG. 1. FIG. 4 does show that the switch commands for the various channel video switches need not be ordered in any particular manner, since the command word 60 shows that commands for Ch 1 and Ch 3 command word 62 shows that commands for Ch 1 and Ch 2. As stated earlier FIG. 4 is only one way of formatting the command and data stream sent to the cable video head at each of the cable systems and other types of formatting can be utilized.

Figure 5:
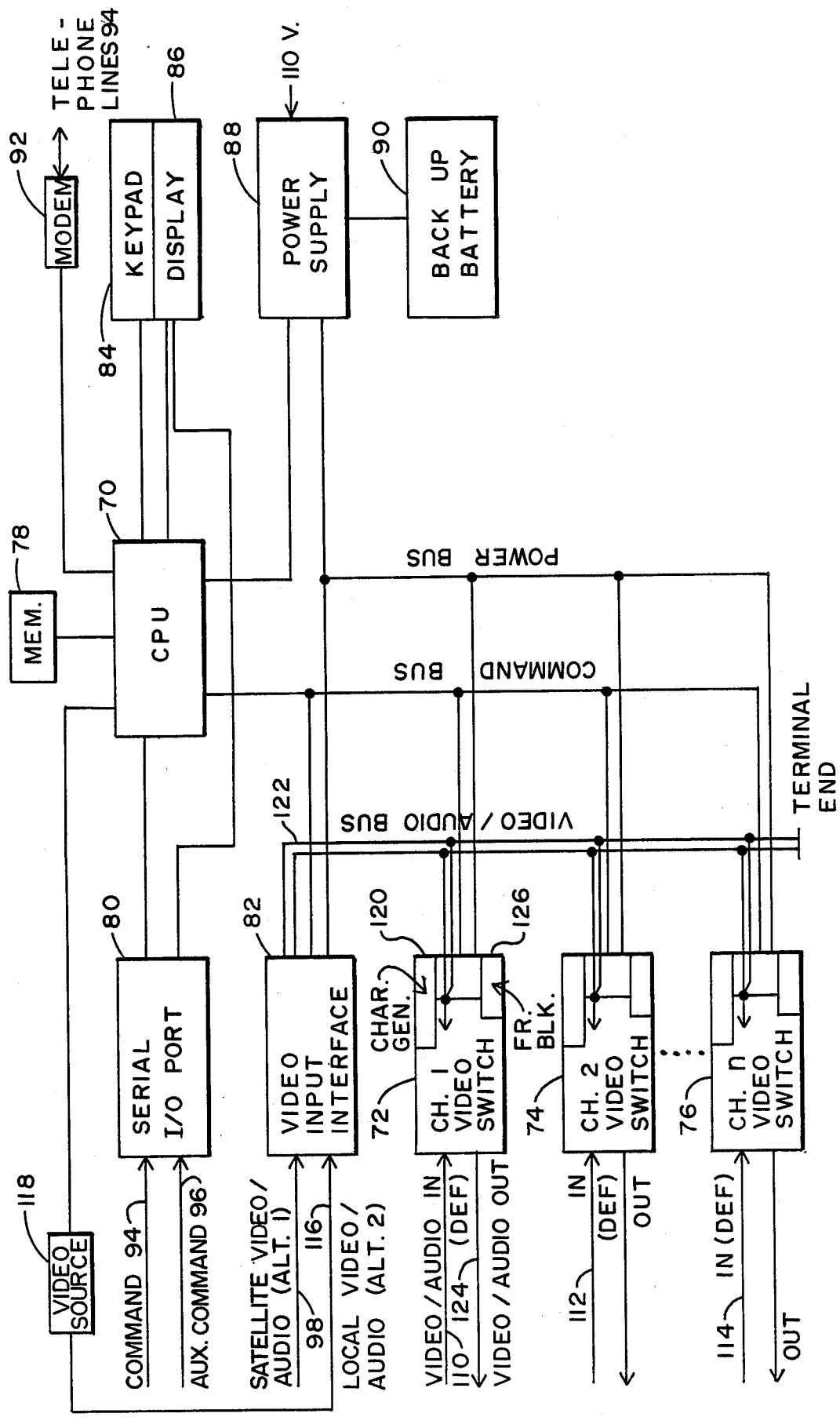
FIG. 5 illustrates, in block diagram form, the video switch system at the video head of each cable system.

FIG. 5 shows, in block diagram form, the multiple input-multiple output video switch system that is located at the video head of each cable system. This video switch system is an important part of the present invention. FIG. 5 shows that the video switch system is a microprocessor based system that includes CPU 70 operating to control video switches 72, 74 and 76, respectively controlling the output for Ch 1, Ch 2 and Ch n. CPU 70 operates in conjunction with a memory 78, serial input/output port 80, video input interface 82, keypad input device 84, display device 86 and a power system that includes power supply 88 and a backup battery 90. A 110 volt power source is applied to power supply 88 and power is distributed to the various elements by the power bus. CPU 70 is also connected to a modem 92 which in turn is connected to telephone lines 94 for various input and output of data, programs and instructions to and from CPU 70 and memory 78.

Command input line 94, auxiliary command input line 96, and satellite video/audio (Alt. 1) input 98 are connected to satellite dish 18 of cable system 1 as shown in FIG. 2. Also connected to satellite dish 18 are video/audio input line 110 for Ch 1 and Ch 2 video input line 112 and Ch n video input line 114. Command input line 94, auxiliary command input line 96 and satellite video/audio (Alt. 1) command line 98 are coupled to the second telecommunications network via satellite dish 18 and signals on those lines ultimately begin at control center 10 which is part of the commercial insertion system of the present invention. In contrast, Ch 1 video input line 110, Ch 2 video input line 112, and Ch n video input line 114 are carried by the first telecommunications network and can be thought as originating at program origin 12 in FIG. 2.

In contrast to the above, local video/audio (Alt. 2) input line 116 obtains its signal from a video source 118. Video source 118 is, in one embodiment, an IBM personal computer model AT with an AT&T Targa 16 video board. In the preferred embodiment, video source 118 generates a local video signal that is a fixed frame video display of the logo for the local cable company.

CPU 70 monitors the incoming stream of command signals via serial input/output port 80. Auxiliary command line 96 carries backup command signals for error checking and as a backup if the commonly used command signal stream is adversely affected by the second telecommunications network. CPU 70 determines whether the address for the command words (see words 50, 52, 60 and 62 in FIG. 4) corresponds to the address word in memory 78. In other words, cable systems 1 and 2 in FIG. 2 have an East Coast address whereas cable system 3 has a West Coast address and CPU 70 recognizes the appropriate address. After registering that address, CPU 70 then identifies what video switch should be activated. For example, command word Ch 1-DEF-t is sensed by CPU 70 and the CPU commands Ch 1 video switch 72 to switch to the default channel (the programmed channel video signal on video input line 110) at time t. In the illustrated embodiment, CPU 70 would start a time out or count down routine based upon timing signal $t_s$ in command word 50. Otherwise, the command words and switching can be done on a simultaneous basis thereby omitting timing information $t_s$.

CPU 70 also monitors the CI identifier sequence and commands character generator 120 present in each of the video switches to generate a channel information character or characters over each spot commercial such that individuals watching the channel would have a direct correlation between the spot commercial advertisement and the number of the channel on the cable system. Alternatively, the character generator can be disposed in input interface 82. The next command for channel 1 is Ch 1-ALT 2-t. This commands Ch 1 video switch 72 to switch at time t from the programmed channel video signal to the alternate 2 video signal which is the local video generated by video source 18. Alternate 1 and alternate 2 video signals are respectively obtained from the telecommunications network and the local video source and are applied to respective inputs on all of the video switches via pair 122 of the video/audio bus. At the next switch command for channel 1, Ch 1-ALT 1-t, CPU 70 commands video switch 72 to switch at time t from the local video to the sequential stream of commercial insert video signals.

Intermediate each application of these video signals on the output line, a frame blanking circuit 126 is activated. The purpose of frame blanking circuit is to produce a video blanking screen signal on output line 124 for one or two frames such that the video switch can synchronize on the new video signal that should be applied to its output based upon the switching signal generated by CPU 70. Therefore, the frame blanking signal generator outputs, at a time intermediate the application of any one of the programmed channel signals, the commercial insert signal and the local video signal, at least one video blanking frame signal. Frame blanking device 126 can be set to generate a number of video blanking screen signals, either based on software or hardware settings.

Node 128 in switch 72 is simply a diagrammatic illustration and does not represent the summation of the sequential stream of commercial insert video signals with the local video signal. The video/audio bus has a terminal end such that it is a balanced system as is customary in video applications. The command bus from CPU 70 leads to video input interface 82 and video switches 72, 74 and 76. Clearly, the command signals and other data such as the information signals for character generator 120 and the other character generators not numbered in video switches 74 and 76 are also carried by the command bus. Therefore, command bus is not truly a single bus that only carries control signals but rather it is a control and data transfer bus. CPU 70 is part of the means for sensing the second switch command, which is the alternate 1 command and activating character generator 120.

Upon occasion, there may be a spot commercial or a commercial insert that advertises a programming service (e.g., a channel) that is not available on a particular cable system. CPU 70 therefore monitors the CI sequence diagrammatically shown in FIG. 4. This CI sequence can be thought of as made up of a plurality of commercial identifier signals wherein each identifier signal is unique to a particular spot commercial. The channels or services that are incorporated in the cable system are called herein "available channels" and other programming services or channels not so incorporated or viewable on the system are classified herein as "non-available channels". Therefore, the commercial identifier signals can be similarly classified as available commercial identifiers and non-available commercial identifiers. Since CPU 70 monitors the CI sequence, CPU 70 in conjunction with memory 78 has a list of available channels that are utilized by the cable system or station. When a non-available channel identifier is sensed by CPU 70, CPU 70 will generate a command signal which commands all of the non-default set video switches to apply the signal from local video source thereby overriding that particular spot commercial for the non-available channel. Therefore, CPU 70 includes means for changing the video switches and applying the third command signal (alternate 2) to all the switches during the non-available spot commercial and then reapplying the second switch command (commercial insert video) to all video switches. Of course, only the video switches that are set to the second switch setting, that switch setting applying the sequential stream of commercial inserts, are changed during the non-available spot commercial.

Some of the major program steps for CPU 70 are found in program module table 2 that follows:

PROGRAM MODULE TABLE 2

1. Monitor incoming command stream and CI sequence
2. Select correct command words based on address
3. Identify any non-available CI commercial channel spot not having a corresponding channel channel in the cable system
4. During those non-available CI channel spots, override all Alt. 1 (Sat.) set switches for 10 sec. and issue Alt. 2 (local) switch commands
5. Return all switches subject to override to previous state unless otherwise instructed by channel switch command in command word The particular sequence of switching for Ch 1, 2, 3 and n with respect to FIG. 4 is found in the channel output/time table follows:

| CHANNEL OUTPUT/TIME TABLE | | | |
| --- | --- | --- | --- |
| | Video Switch Status | | |
| Channel | Time 1 | Time 2 | Time 3 |
| Ch 1 | Default | Alt 2 (local) | Alt 1 (Sat.) |
| Ch 2 | Alt 1 | same | Alt 2 |
| Ch 3 | Alt 2 | Alt 1 | same |
| Ch n | DEF | Alt 2 | same |

The commercial identifier signals can also be thought to be used to generate tag commands for activating the character generators in the video switch. The character generators add a cable unique channel number to the spot commercial to enable a viewer to tune into the advertised show.

CPU 70 and memory 78 are also configured, in a preferred embodiment, to record the number of commercial spots that are actually played on each channel. This record keeping routine is well known in the art. Therefore, memory 78 stores a record of the time, date and play time for each channel for each insert and CPU 70 can be called via modem 92 to download the record keeping information from memory 78 through modem 92 to telephone lines 94.

Keypad 84 is utilized to input data, commands, other information and control strings into memory 78 via CPU 70. For example, keypad 84 can be utilized to change a channel from a non-available channel to an available channel. CPU 70 in one embodiment is a CMOS Z 80 microprocessor and memory 78 includes, among other things, a 56k PROM/RAM memory. Memory 78 has in the preferred embodiment a memory mapped input/output section. A clock/calendar (not shown) is also included in the system that enables the CPU to verify the time and keep appropriate records. Memory 78 also includes two 8k bit ROM memory segments, the first being the program segment and the second being information specific to the particular cable system. The RAM memory is split into sections for local calculation and for storage of actual records.

Display 86 displays the date and time of the cable system and provides a continual display of video activity for each channel. The display also includes an interpretation or representation of the switch settings for all the video switches. The serial I/O port 80 accepts asynchronous signals and has rates. Currently, a 1200 baud data rate is used in an embodiment. Power supply 88 receives 110 volt AC power and generates and distributes DC power to all the elements. To prevent video cross talk and interference from digital signals, the power to the video and audio elements is provided on a single voltage feed line with local generation of both positive and negative voltages. The AC power source is also used to charge backup battery 90 such that the battery can provide power when the AC power is not available. Since the video switch system is configured mostly with CMOS elements, the backup battery should provide power for the switch system for four hours.

Video input interface 82 distributes the video and audio signals to the video/audio bus. The input signals are impedance matched to the input cables and isolation filters are incorporated in the interface to provide for isolation of all the signals.

As an alternative embodiment, the video input may have the character generation device 120 therein. In that instance, CPU 70 would command character generator in input interface 82 to overlay text onto the commercial spots in the stream commercial insert video signals.

Solid state video switches are used in switches 72, 74 and 76. These solid state switches must be powered at all times, therefore backup battery 90 is used in case of a power failure from the AC power source.

The claims appended hereto are meant to cover modifications and changes. For example, the video switching system may be a distributed processing system, rather than a central processing system as shown, with a microprocessor in each one of the video switches. These and other changes are meant to be covered by the appended claims.

What is claimed is:

1. A multiple input video switch system for selecting one video composite signal from a group of a programmed channel signal, a commercial insert video signal and a local video signal, said programmed channel signal and said commercial insert signal respectively sent via first and second telecommunications networks, and the switch system being remotely controlled by first, second and third channel switch commands sent via said second telecommunications network, the switch system comprising:

means for generating said local video signal; and,
    video switch means for receiving at three respective video inputs, said programmed channel signal from said first telecommunications network, said commercial insert signal from said second telecommunications network and said local video signal and for respectively applying the same at a video output based upon receipt of said first, second and third switch commands, from said second telecommunications network, at a control input of the video switch means.

2. A video switch system as claimed in claim 1 including interface means coupled to said second telecommunications network for conditioning said first, second and third switch commands before application to said video switch means.

3. A video switch system as claimed in claim 1 including a frame blanking means for generating at least one video blanking screen signal at said video output, at a time intermediate the application of any one of said programmed channel signal, said commercial insert signal and said local video signal, at said video output.

4. A video switch system as claimed in claim 1 including a character generating signal means for adding identification information to said commercial insert signal.

5. A video switch system as claimed in claim 4 including means for sensing said second switch command and for activating said character generating means.

6. A video switch system as claimed in claim 1 wherein said video switch means is associated with one of a plurality of available channels, said commercial insert signal is a plurality of commercial insert video signals, each associated with a respective commercial identifier signal sent via said second telecommunications network, one of the commercial identifier signals is a non-available commercial channel identifier signal corresponding to a non-available channel in said video switch system and some of said identifier signals correspond to said available channels, the video switch system including means for changing said video switch means and applying at said video output said local video signal upon detection of said non-available commercial channel identifier signal and reapplying said plurality of commercial insert signals to said video output when said non-available commercial channel identifier signal is removed.

7. A multiple input video switching system for receiving a plurality of programmed channel video composite signals, each programmed channel video signal corresponding to a respective channel of a plurality of channels and for selecting, on a per channel basis, said programmed channel video signal, a sequential stream of commercial insert video signals and a local video signal, said plurality of programmed channel video signals and said sequential stream of commercial insert signals respectively sent via first and second telecommunications networks, and the switching system being remotely controlled on a per channel basis, by respective first, second and third switch commands, corresponding to a respective programmed channel video signal, the commercial insert stream and said local video signal, and being sent via said second telecommunications network, the switching system comprising:
  means for generating said local video signal; and,
  a plurality of video switch means, a respective video switch means corresponding to one each of said plurality of channels, each video switch means receiving at three respective video inputs, the corresponding programmed channel video signal, said stream of commercial insert video signals, from said second telecommunications network, and said local video signal and having means for respectively applying the same at a video output based upon receipt of said respective first, second and third switch commands at a control input of said video switch means.

8. The video switching system as claimed in claim 7 wherein said respective first, second and third switch commands correspond to a respective one of said plurality of channels, the video switching system including a processing means for receiving said respective first, second and third switch commands and for controlling said plurality of video switch means via respective first, second and third command signals sent to respective control inputs of said plurality of video switch means, each video switch means including means for responding to said respective first, second and third command signals and for activating said means for applying thereby switching the video signal at the output of said respective video switch means.

9. The video switching system as claimed in claim 8 wherein said sequential stream of commercial insert video signals is a plurality of spot commercials, each spot commercial having associated with it a corresponding commercial identifier signal, a plurality of commercial identifier signals being sent via said second telecommunications network, said processing means including means for receiving and responding to said commercial identifier signals and generating tag commands representative thereof, the video switching system including a character generating signal means for receiving said tag commands and generating video overlay information onto the corresponding spot commercial.

10. The video switching system as claimed in claim 9 wherein each said video switch means includes a separate character generating signal means, and wherein said tag commands are applied, via the commercial identifier means, to the control input of said video switch means.

11. The video switching system as claimed in claim 8 wherein each video switch means includes a frame blanking means for generating at least one video blanking signal and applying said blanking signal to the video output of said video switch means at a switch over time between application of said programmed channel video signal, said stream of commercial video signals and said local video signal.

12. The video switching system as claimed in claim 8 wherein said plurality of channels includes a plurality of available channels and at least one non-available channel, said sequential stream of commercial insert video signals is a plurality of spot commercials, each spot commercial having associated with it a commercial identifier signal, the plurality of commercial identifier signals being sent via said second telecommunications network, one of the commercial identifier signals and the associated spot commercial corresponding to said at least one non-available channel, said processing means including means for sensing the presence of the one commercial identifier corresponding to said non-available channel and including means for changing said plurality of video switch means to apply, at the respective video outputs, said local video signal upon sensing of said one commercial identifier and reapply said sequential stream of commercial insert video signals to said video outputs when said one commercial identifier is removed.

13. The video switching system as claimed in claim 8 including memory means for keeping a record of the stream of commercial insert video signals output from each of said plurality of video switch means.

14. A commercial insertion system for inserting, in local available time slots in a plurality of programmed channel video composite signals, at least one of a plurality of commercial spots grouped as a sequential stream of commercial insert video signals, each said programmed channel video signal corresponding to a respective channel of a plurality of channels transmitted over a first telecommunications network, the commercial insertion system operating in conjunction with a second telecommunications network and comprising:

at a control center:

means for monitoring each programmed channel video signal and detecting the presence of a local avail signal in said programmed channel video signal;

means for generating said sequential stream of commercial insert video signals comprising said plurality of spot commercials upon receipt of a send command;

processor means, coupled to said means for monitoring and commercial insert generating means, for generating respective first, second and third switch command signals, on a per channel basis, said first switch command generated during said programmed channel video signal before and after said local avail signal, said second switch command signal generated after detection of said local avail signal and at a leading time edge of a spot commercial of said sequential stream of commercial insert video signals, and said third switch command signal generated at any time when said local avail signal is detected during a play time of an intermediate commercial spot in said sequential stream of commercial insert video signals, said processor means including means for starting said sequential stream of commercial insert video signals upon detection of a first detected local avail signal on any of said plurality of programmed channel video signals by generating said second command and applying it to said commercial insert generating means;

means for sending, coupled to said commercial insert generating means and said processor means, said stream of commercial insert video signals and said first, second and third switch command signals for all of said of plurality of channels over said second telecommunications network to a remote cable television system; and, at said remote cable system:

means for generating said local video signal; and, at least one video switch means for receiving at three respective video inputs, one of said plurality of programmed channel signals, said commercial insert signal and said local video signal and for respectively applying the same at a video output based upon receipt of said first, second and third switch commands, corresponding to said one programmed channel signal, at a control input of the video switch means.

15. A system as claimed in claim 14 wherein said video switch means includes a frame blanking means for generating at least one video blanking screen signal at said video output at a time intermediate the application of any one of said programmed channel signal, said commercial insert signal and said local video signal at said video output.

16. A system as claimed in claim 14 wherein said video switch means includes a character generating signal means for adding identification information to said commercial insert signal.

17. A system as claimed in claim 14 including at said remote cable system:

a plurality of video switch means, a respective video switch means corresponding to one each of said plurality of channels, each video switch means receiving at three respective video inputs, the corresponding programmed channel video signal, said stream of commercial insert video signals and said local video signal and having means for respectively applying the same at a video output based upon receipt of said respective first, second and third switch commands at a control input of said respective video switch means.

18. The system as claimed in claim 17 wherein said respective first, second and third switch commands correspond to a respective one of said plurality of channels, the remote cable system having, coupled to said plurality of video switch means a processing means for receiving said respective first, second and third switch commands and for controlling said plurality of video switch means via respective first, second and third command signals sent to respective control inputs of said plurality of video switch means, each video switch means including means for responding to said respective first, second and third command signals and for activating said means for applying thereby switching the video signal at the output of said video switch means.

19. The system as claimed in claim 18 wherein said processor means at said control center includes means for generating a stream of commercial identifier signals corresponding to respective spot commercials of said stream of commercial insert video signals, and said means for sending transmits the commercial identifier stream via said second telecommunications network along with said first, second and third switch command signals, and wherein said processing means, at said remote cable system, including means for receiving and responding to said commercial identifier signals and generating tag commands representative thereof, and including a character generating signal means for receiving said tag commands and generating video overlay information onto the corresponding spot commercial.

20. The system as claimed in claim 19 wherein each said video switch means includes one of said character generating signal means, said tag commands are applied, via the commercial identifier means, to the control input of said video switch means.

21. The system as claimed in claim 18 wherein each video switch means includes a frame blanking means for generating at least one video blanking signal and applying said blanking signal to the video output of said video switch means at least at a switch over time between application of said programmed channel video signal, said stream of commercial video signals and said local video signal.

22. The system as claimed in claim 18 wherein said plurality of channels includes a plurality of available channels and at least one non-available channel, said processor means at said control center includes means for generating a stream of commercial identifier signals corresponding to respective spot commercials of said stream of commercial insert video signals, and said means for sending transmits the commercial identifier stream via said second telecommunications network along with said first, second and third switch command signals, one of the commercial identifier signals and the associated spot commercial corresponding to said at least one non-available channel, said processing means at said remote cable system including means for sensing the presence of the one commercial identifier corresponding to said non-available channel and means for changing said plurality of video switch means to apply at the respective video outputs said local video signal upon sensing of said one commercial identifier and reapply said sequential stream of commercial insert video signals to said video outputs when said one commercial identifier is removed.

23. The system as claimed in claim 18 wherein said remote cable system includes memory means coupled to said processing means for keeping a record of the stream of commercial insert video signals output from each of said plurality of video switch means.

* * * * *